US011379576B2

(12) United States Patent
Walters et al.

(10) Patent No.: US 11,379,576 B2
(45) Date of Patent: *Jul. 5, 2022

(54) IDENTIFICATION OF DATABASE INTRUSION BY CHANGES IN DATA TABLES

(71) Applicant: Capital One Services, LLC, McLean, VA (US)

(72) Inventors: Austin Walters, Savoy, IL (US); Jeremy Goodsitt, Champaign, IL (US); Vincent Pham, Champaign, IL (US)

(73) Assignee: Capital One Services, LLC, McLean, VA (US)

( * ) Notice: Subject to any disclaimer, the term of this patent is extended or adjusted under 35 U.S.C. 154(b) by 26 days.

This patent is subject to a terminal disclaimer.

(21) Appl. No.: 16/910,794

(22) Filed: Jun. 24, 2020

(65) Prior Publication Data
US 2021/0157901 A1    May 27, 2021

Related U.S. Application Data

(63) Continuation of application No. 16/691,722, filed on Nov. 22, 2019, now Pat. No. 10,699,002.

(51) Int. Cl.
*G06F 21/50*   (2013.01)
*G06F 16/13*   (2019.01)
(Continued)

(52) U.S. Cl.
CPC ............. *G06F 21/50* (2013.01); *G06F 16/13* (2019.01); *G06F 21/35* (2013.01); *G06F 21/60* (2013.01); *G06N 3/02* (2013.01); *G06F 2221/034* (2013.01)

(58) Field of Classification Search
CPC .......... G06F 21/13; G06F 21/50; G06F 21/60; G06F 21/552
See application file for complete search history.

(56) References Cited

U.S. PATENT DOCUMENTS

| | | | |
|---|---|---|---|
| 2007/0086624 A1* | 4/2007 | Breed | B60R 21/01516 382/104 |
| 2009/0074246 A1* | 3/2009 | Distante | G06K 9/32 382/103 |

(Continued)

OTHER PUBLICATIONS

Mohammadpour, Leila; Ling, Teck Chaw; Liew, Chee Sun; and Chong, Chun Yong, "A Convolutional Neural Network for Network Intrusion Detection System," Proceedings of the APAN—Research Workshop 2018 (ISBN 978-4-9905448-8-1), p. 50-55.

(Continued)

*Primary Examiner* — Dao Q Ho
(74) *Attorney, Agent, or Firm* — Banner & Witcoff, Ltd.

(57) ABSTRACT

Aspects described herein may allow for the application of an artificial neural network architecture to identify intrusion in a database. Changes to components of a data table of the database may be tracked as a snapshot of the changes over a period of time. Any change in the data table may be associated with a user. Utilizing multiple snapshots, a background substitution technique may be utilized to generate a matrix of the changes to the data table over a period of time. A model having an artificial neural network architecture may utilize the matrix as an input set to identify the user as an unauthorized user accessing the database.

20 Claims, 7 Drawing Sheets

(51) Int. Cl.
    *G06N 3/02*         (2006.01)
    *G06F 21/35*       (2013.01)
    *G06F 21/60*       (2013.01)

(56) References Cited

U.S. PATENT DOCUMENTS

| | | | |
|---|---|---|---|
| 2010/0014781 A1* | 1/2010 | Liu | H04N 13/261 |
| | | | 382/285 |
| 2018/0157976 A1* | 6/2018 | Sun | G06N 3/0454 |
| 2021/0157901 A1* | 5/2021 | Walters | G06N 3/02 |

OTHER PUBLICATIONS

Liu, Yuchen; Liu, Shengli; & Zhao, Xing, "Intrusion Detection Algorithm Based on Convolutional Neural Network," 2017 4th Internaitonal Conference on Engineering Technology and Application (ICETA 2017) ISBN: 978-1-60595-527-8, pp. 9-13.

\* cited by examiner

|  | Account ID | Account Type | Amount | Telephone | Address |
|---|---|---|---|---|---|
| Person 1 | AAAAA | Standard | Amount 1 | Number 1 | Address 1 |
| Person 2 | BBBBB | Premium | Amount 2 | Number 2 | Address 2 |
| Person 3 | CCCCC | Basic | Amount 3 | Number 3 | Address 3 |
| Person 4 | DDDDD | Standard | Amount 4 | Number 4 | Address 4 |

FIG. 5A

|  | Account ID | Account Type | Amount | Telephone | Address |
|---|---|---|---|---|---|
| Person 1 | AAAAA | Standard | Amount 1 | Number 1 | Address 1 |
| Person 2 | BBXBB | Premium | Amount 2 | Number 2 | Address 8 |
| Person 3 | CCCCC | Basic | Amount 3 | Number 3 | Address 3 |
| Person 4 | DDDDD | Premium | Amount 7 | Number 4 | Address 4 |

FIG. 5B

|  | Column 1 | Column 2 | Column 3 | Column 4 | Column 5 |
|---|---|---|---|---|---|
| Row 1 | 1 | 1 | 1 | 1 | 1 |
| Row 2 | 100 | 1 | 1 | 1 | 2.5 |
| Row 3 | 1 | 1 | 1 | 1 | 1 |
| Row 4 | 1 | 50 | 200 | 1 | 1 |

FIG. 6A

|  | Column 1 | Column 2 | Column 3 | Column 4 | Column 5 |
|---|---|---|---|---|---|
| Row 1 | 0.005 | 0.005 | 0.005 | 0.005 | 0.005 |
| Row 2 | 0.5 | 0.005 | 0.005 | 0.005 | 0.0125 |
| Row 3 | 0.005 | 0.005 | 0.005 | 0.005 | 0.005 |
| Row 4 | 0.005 | 0.25 | 1 | 0.005 | 0.005 |

FIG. 6B

IDENTIFICATION OF DATABASE INTRUSION BY CHANGES IN DATA TABLES

CROSS REFERENCE TO RELATED APPLICATION

The present application is a continuation application of U.S. application Ser. No. 16/691,722, filed Nov. 22, 2019, the disclosure of which is incorporated herein by reference in its entirety.

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF USE

Aspects of the disclosure relate generally to intrusion detection within a database. More specifically, aspects of the disclosure may provide for enhanced intrusion detection that identifies unauthorized access to a database by tracking changes in a data table and using a neural network architecture for image recognition to detect intrusion.

BACKGROUND

Networked architectures allow for an ever increasing amount of data to be accessible from anywhere at any time. Coupled with the rapid expansion of internet based architectures, security of such data has become increasingly more important. Network administrators must contend with constant threats of attacks and malware from hackers and other unauthorized entities. Such attacks are ever evolving and defense mechanisms against such attacks have to monitor large amounts of network traffic while providing accurate results. Although such mechanisms prevent the vast majority of unauthorized access, a single access that goes undetected can effectively cripple an entity.

Intrusion detection systems have been utilized as one form of defense against such attacks. Intrusion detection systems monitor and analyze real-time network flow to detect unauthorized intrusion or a hostile attack on the network. Such intrusion detection systems can compare certain abnormal network behavior against normal network behavior to capture an attack. Recently, neural network models have been introduced in addressing the accuracy of such intrusion detection systems. Deep neural network models may contain millions of parameters that extract hierarchies of features from data, enabling them to learn from a large amount of data compared to earlier shallow networks. However, improvements in utilizing neural network architectures for intrusion detection are needed.

A convolutional neural network is a form of deep neural network architecture that improves the accuracy in image classification and brings a qualitative aspect to an image classification task. A specifically designed convolutional neural network model can be designed for any database. The convolutional neural network model may be used for training samples in a database to obtain a relationship between the samples in the database and labels of the samples. In such a case, the sample in the database may be an image.

Aspects described herein may address these and other problems, and generally improve the quality, efficiency, and speed of intrusion detection systems in a database with data tables by offering an improved matrix input for machine learning systems.

SUMMARY

The following presents a simplified summary of various aspects described herein. This summary is not an extensive overview, and is not intended to identify key or critical elements or to delineate the scope of the claims. The following summary merely presents some concepts in a simplified form as an introductory prelude to the more detailed description provided below.

Aspects described herein may allow for the application of tracking changes in a data table of a database. For each change to a component of a data table of a database, a value representative of the change in the component of the data table in the database may be utilized. Values representative of changes may represent the magnitude of changes in a row or cell of a data table of the database. Changes in one or more components of the data table of a database may be tracked. The tracking may include a snapshot of the changes and each change is associated with a particular user for tracking purposes. A background subtraction technique may be utilized to take the snapshot and at least one previous snapshot to generate a matrix representative of the changes. Aspects described herein account for generation of one dimensional, two dimensional, and three dimensional matrices.

Further aspects described herein may provide for initializing and utilizing a model having a neural network architecture to identify intrusions in a database. A matrix representative of changes to a data table of a database may be utilized to detect unauthorized access to the database. A neural network such as a deep neural network (e.g., a convolutional neural network) may be utilized. Any of a number of other image detection systems may be used, including nearest-neighbor (NN), support vector machines (SVM), and multi-layer perceptron (MLP). A neural network may be built and/or trained to accurately identify an intruder to a database based upon a matrix input set. Such a neural network may be built by recognizing normal behavior and/or abnormal behavior of one or more users accessing the database. Such a recognition may occur by utilizing one or more tracked changes within the database based upon snapshots of the changes and generating a matrix. Such a matrix may contain a representation of changes within the database. For example, such a matrix may include the normalized time (across the database) since the database was last edited. Upon receiving the matrix as an input data set to the model, an intrusion of the database may be identified and the particular user associated with the intrusion may be identified.

Corresponding apparatus, systems, and computer-readable media are also within the scope of the disclosure.

These features, along with many others, are discussed in greater detail below.

BRIEF DESCRIPTION OF THE DRAWINGS

The present disclosure is illustrated by way of example and not limited in the accompanying figures in which like reference numerals indicate similar elements and in which:

FIG. 5A depicts an example data table in a database according to one or more aspects of the disclosure;

FIG. 5B depicts an example changed data table in a database according to one or more aspects of the disclosure;

FIGS. 6A-6B depict an example changed data table representative of a magnitude of change according to one or more aspects of the disclosure.

DETAILED DESCRIPTION

In the following description of the various embodiments, reference is made to the accompanying drawings, which form a part hereof, and in which is shown by way of illustration various embodiments in which aspects of the disclosure may be practiced. It is to be understood that other embodiments may be utilized and structural and functional modifications may be made without departing from the scope of the present disclosure. Aspects of the disclosure are capable of other embodiments and of being practiced or being carried out in various ways. Also, it is to be understood that the phraseology and terminology used herein are for the purpose of description and should not be regarded as limiting. Rather, the phrases and terms used herein are to be given their broadest interpretation and meaning. The use of "including" and "comprising" and variations thereof is meant to encompass the items listed thereafter and equivalents thereof as well as additional items and equivalents thereof.

By way of introduction, aspects discussed herein may relate to methods and techniques utilizing background subtraction for identifying unauthorized access to a database. As discussed further herein, this combination of features may allow for utilizing matrices generated by a background subtraction technique as input to neural networks for intrusion detection.

Before discussing these concepts in greater detail, however, several examples of a computing device that may be used in implementing and/or otherwise providing various aspects of the disclosure will first be discussed with respect to FIG. 1.

Figure 1:
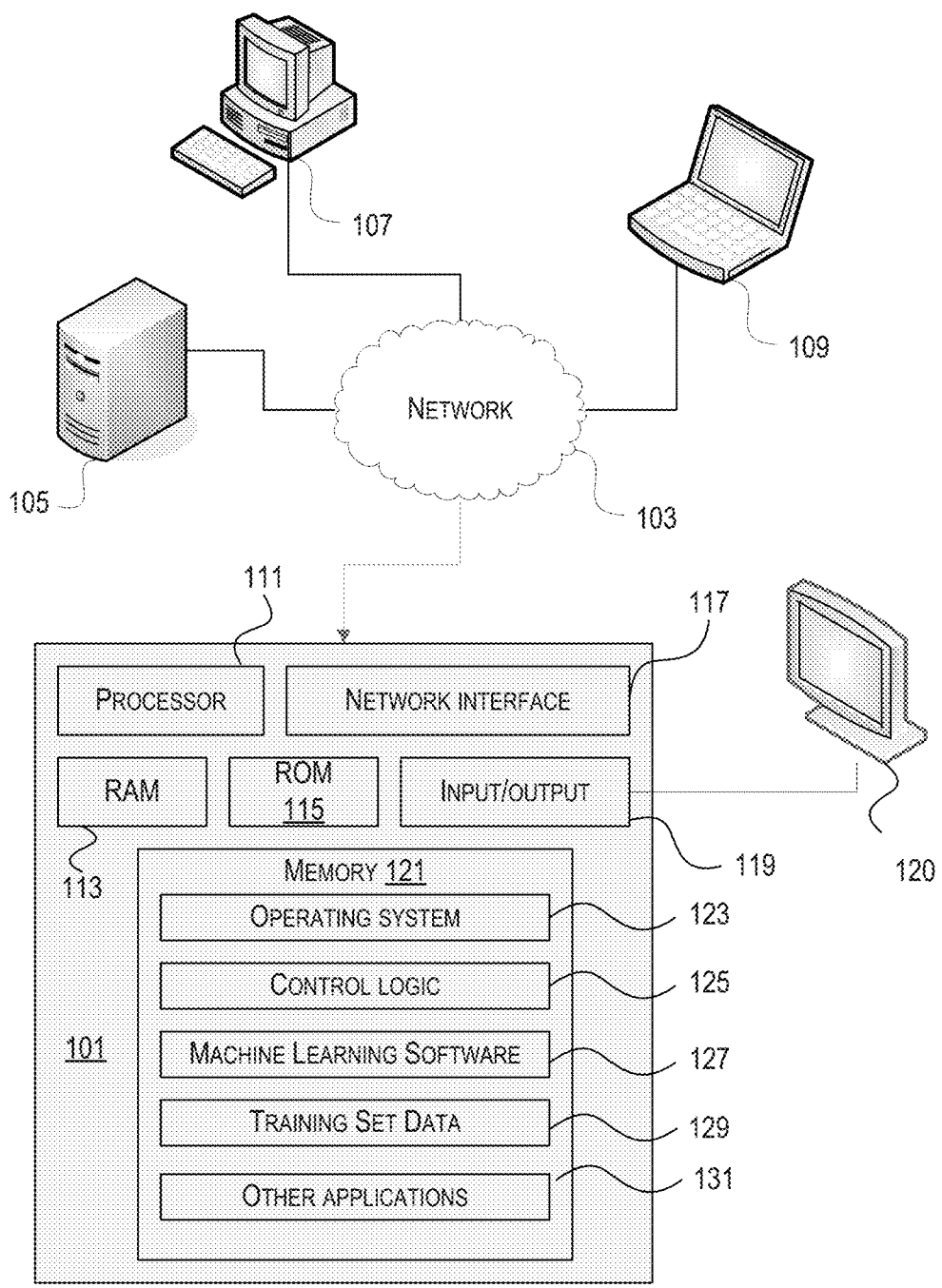
FIG. 1 depicts an example of a computing device that may be used in implementing one or more aspects of the disclosure in accordance with one or more illustrative aspects discussed herein.

FIG. 1 illustrates one example of a computing device 101 that may be used to implement one or more illustrative aspects discussed herein. For example, computing device 101 may, in some embodiments, implement one or more aspects of the disclosure by reading and/or executing instructions and performing one or more actions based on the instructions. In some embodiments, computing device 101 may represent, be incorporated in, and/or include various devices such as a desktop computer, a computer server, a mobile device (e.g., a laptop computer, a tablet computer, a smart phone, any other types of mobile computing devices, and the like), and/or any other type of data processing device.

Computing device 101 may, in some embodiments, operate in a standalone environment. In others, computing device 101 may operate in a networked environment. As shown in FIG. 1, various network nodes 101, 105, 107, and 109 may be interconnected via a network 103, such as the Internet. Other networks may also or alternatively be used, including private intranets, corporate networks, LANs, wireless networks, personal networks (PAN), and the like. Network 103 is for illustration purposes and may be replaced with fewer or additional computer networks. A local area network (LAN) may have one or more of any known LAN topology and may use one or more of a variety of different protocols, such as Ethernet. Devices 101, 105, 107, 109 and other devices (not shown) may be connected to one or more of the networks via twisted pair wires, coaxial cable, fiber optics, radio waves or other communication media.

As seen in FIG. 1, computing device 101 may include a processor 111, RAM 113, ROM 115, network interface 117, input/output interfaces 119 (e.g., keyboard, mouse, display, printer, etc.), and memory 121. Processor 111 may include one or more computer processing units (CPUs), graphical processing units (GPUs), and/or other processing units such as a processor adapted to perform computations associated with machine learning. I/O 119 may include a variety of interface units and drives for reading, writing, displaying, and/or printing data or files. I/O 119 may be coupled with a display such as display 120. Memory 121 may store software for configuring computing device 101 into a special purpose computing device in order to perform one or more of the various functions discussed herein. Memory 121 may store operating system software 123 for controlling overall operation of computing device 101, control logic 125 for instructing computing device 101 to perform aspects discussed herein, machine learning software 127, training set data 129, and other applications 129. Control logic 125 may be incorporated in and may be a part of machine learning software 127. In other embodiments, computing device 101 may include two or more of any and/or all of these components (e.g., two or more processors, two or more memories, etc.) and/or other components and/or subsystems not illustrated here.

Devices 105, 107, 109 may have similar or different architecture as described with respect to computing device 101. Those of skill in the art will appreciate that the functionality of computing device 101 (or device 105, 107, 109) as described herein may be spread across multiple data processing devices, for example, to distribute processing load across multiple computers, to segregate transactions based on geographic location, user access level, quality of service (QoS), etc. For example, devices 101, 105, 107, 109, and others may operate in concert to provide parallel computing features in support of the operation of control logic 125 and/or software 127.

One or more aspects discussed herein may be embodied in computer-usable or readable data and/or computer-executable instructions, such as in one or more program modules, executed by one or more computers or other devices as described herein. Generally, program modules include routines, programs, objects, components, data structures, etc. that perform particular tasks or implement particular abstract data types when executed by a processor in a computer or other device. The modules may be written in a source code programming language that is subsequently compiled for execution, or may be written in a scripting language such as (but not limited to) HTML or XML. The computer executable instructions may be stored on a computer readable medium such as a hard disk, optical disk, removable storage media, solid state memory, RAM, etc. As will be appreciated by one of skill in the art, the functionality of the program modules may be combined or distributed as desired in various embodiments. In addition, the functionality may be embodied in whole or in part in firmware or hardware equivalents such as integrated circuits, field programmable gate arrays (FPGA), and the like. Particular data structures may be used to more effectively implement one or more aspects discussed herein, and such data structures are contemplated within the scope of computer executable instructions and computer-usable data described herein. Various aspects discussed herein may be embodied as a method, a computing device, a data processing system, or a computer program product.

Having discussed several examples of computing devices which may be used to implement some aspects as discussed further below, discussion will now turn to a method for detection of intrusion in a database by using background subtraction and an illustrative model having a neural network architecture.

Figure 2:
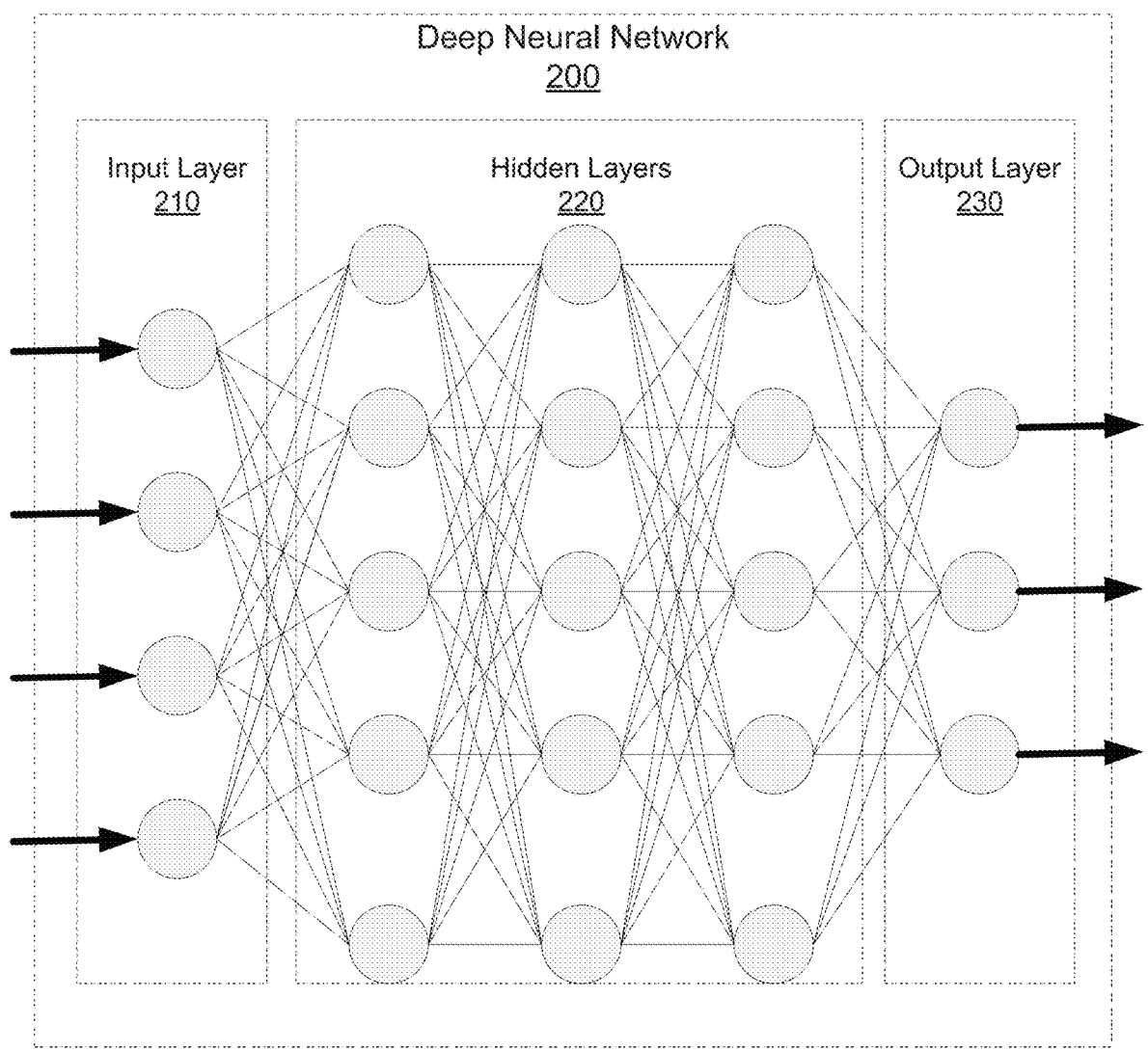
FIG. 2 depicts an example neural network architecture for a model according to one or more aspects of the disclosure.

FIG. 2 illustrates an example artificial neural network architecture, such as a deep neural network architecture 200. An artificial neural network may be a collection of connected nodes, with the nodes and connections each having assigned weights used to generate predictions. Each node in the artificial neural network may receive input and generate an output signal. The output of a node in the artificial neural network may be a function of its inputs and the weights associated with the edges. Ultimately, the trained model may be provided with input beyond the training set and used to generate predictions regarding the likely results. Artificial neural networks may have many applications, including image recognition, object classification, speech recognition, natural language processing, text recognition, regression analysis, behavior modeling, and others.

A model that includes an artificial neural network architecture may be built for the purpose of identification of intruders (unauthorized users) to a database. Such a model may be built to recognize normal behavior of one or more users. Alternatively and/or in addition, such a model may be built to recognize abnormal behavior of one or more users accessing the database. Multiple users may be referred to as clusters of users. Such a cluster of users may have similar privileges for accessing a database. Alternatively and/or concurrently, such a cluster of users may have similar behavior patterns when accessing a database. For example, a cluster of users may be set as part of building the model where the cluster of users are users that historically access certain fields in a data table of the database. Such a cluster may generally access telephone number and/or address fields, but may rarely, if ever, access account number fields. As such, a model that includes an artificial neural network architecture may be built to recognize known patterns of accessing behavior and/or known patterns of abnormal behavior for one or more users, including clusters of users. One manner for such a recognition of patterns, whether normal behavior or abnormal behavior, may be the result of utilizing one or more tracked changes within the database based upon snapshots of the changes and generating a matrix. Such a matrix may be the input set to the model where the model may thereafter train and retrain to identify one or more intruders accessing a database. By building a model based on a training set that includes a number of normal and abnormal examples, a plurality of model parameters may be defined to identify one or more intruders to a database. Similarly, by training a model based on a training set that includes a number of normal and abnormal examples, a plurality of model parameters may be refined to identify one or more intruders to a database.

An artificial neural network may have an input layer 210, one or more hidden layers 220, and an output layer 230. A deep neural network, as used herein, may be an artificial network that has more than one hidden layer. Illustrated network architecture 200 is depicted with three hidden layers, and thus may be considered a deep neural network. The number of hidden layers employed in deep neural network 200 may vary based on the particular application and/or problem domain. For example, a network model used for image recognition may have a different number of hidden layers than a network used for speech recognition. Similarly, the number of input and/or output nodes may vary based on the application. Many types of deep neural networks are used in practice, such as convolutional neural networks, recurrent neural networks, feed forward neural networks, combinations thereof, and others. Aspects described herein may be used with any type of neural network, and for any suitable application.

Aspects described herein may find particular use with convolutional neural network architectures. Among other types of layers, a convolutional neural network model may include convolution layers and pooling layers. A convolution layer applies a convolution operation to an input set and is configured to extract a feature of a sample, such as an image, in the database. A pooling layer is configured to reduce a computational effort for the model by combining the outputs of neuron clusters at one layer into a single neuron at a next layer. The convolution layer and the pooling layer are each arranged with a processing template. A convolutional neural network model may include any number of convolution layers and pooling layers.

Having discussed the detailed computations which may enable an artificial neural network model to be trained, discussion will now turn to an illustrative method for identifying an unauthorized user to a database.

Aspects described herein may be used to detect unauthorized changes to a data table. For example, an enterprise may store records in one or more data tables. Malicious users may seek to access those data tables, and also may make changes to the records. For example, a malicious user may alter an account balance or make other changes. It may be important for system administrators to quickly identify the malicious access. Tracking changes to the data records may allow for identification and detection of malicious access. The various techniques and features described further herein may generate representations of changes to the records of the data table which may be used by neural network models to identify malicious access. Once identified, system administrators may take appropriate action to address the malicious access. An illustrative method according to some of these aspects is described further below with reference to FIG. 3.

Figure 3:
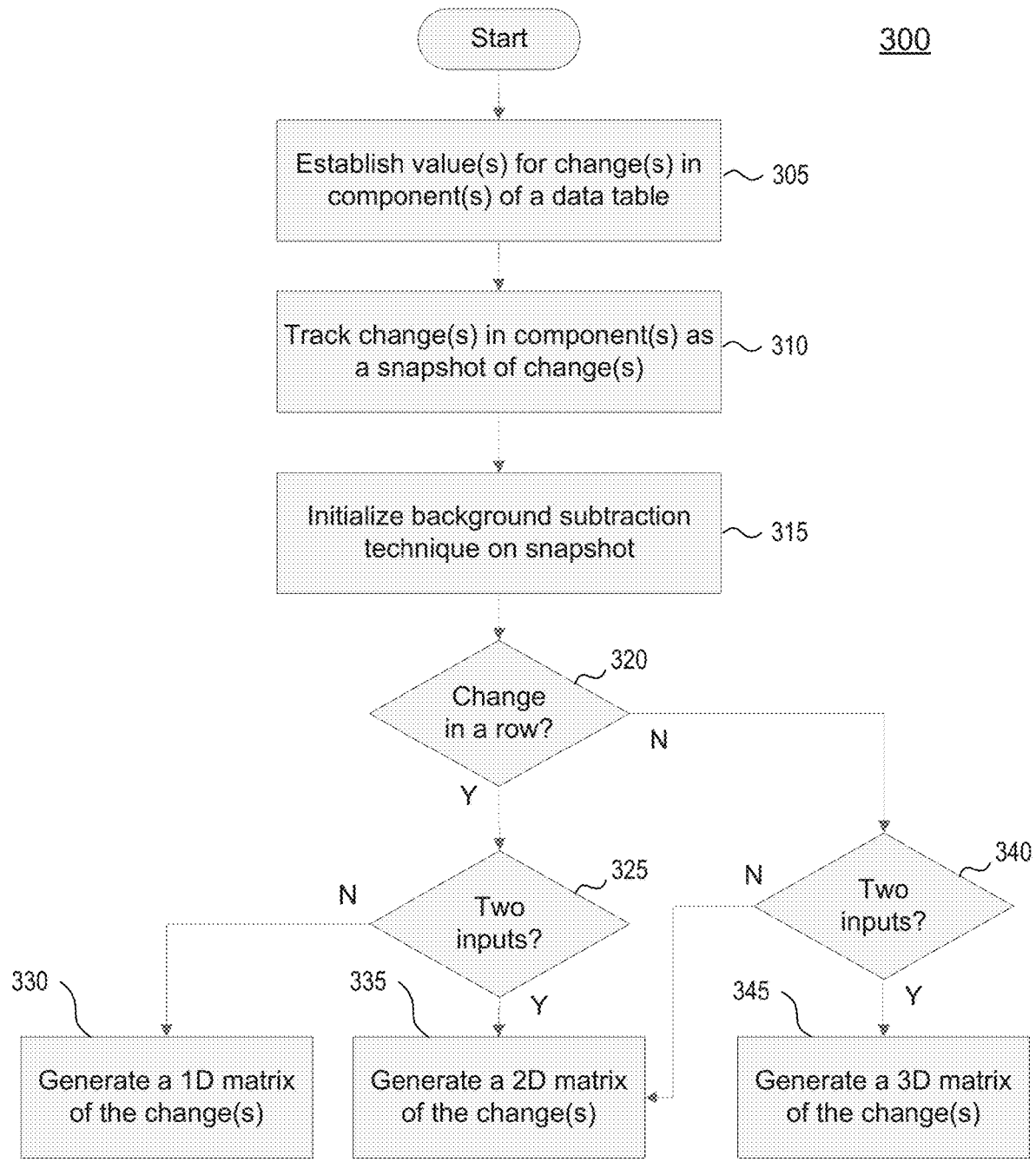
FIG. 3 depicts a flow chart for a method of tracking changes in a data table of a database according to one or more aspects of the disclosure.

FIG. 3 illustrates an example method 300 of tracking changes in a data table of a database in accordance with one or more aspects described herein. As used herein (and as discussed above with respect to FIG. 2), a deep neural network may be an artificial neural network that includes an input layer, and output layer, and more than one hidden layer. Method 300 may be implemented by a suitable computing system, as described further herein. For example, method 300 may be implemented by any suitable computing environment by a computing device and/or combination of computing devices, such as computing devices 101, 105, 107, and 109 of FIG. 1. Method 300 may be implemented in suitable program instructions, such as in machine learning software 127, and may operate on a suitable training set, such as training set data 129. FIG. 5A depicts an example data table 500 in a database according to one or more aspects of the disclosure. Data table 500 may be much larger than the data table shown and it should be understood that the example data table 500 is merely illustrative of a data table. Data table 500 is shown to include a number of rows 501 and columns 503. By a combination of a particular row and column, data table 500 includes a cell, e.g., cells 505-511. FIG. 5B depicts the example data table 500 in the database according to one or more aspects of the disclosure. In FIG. 5B, noted cells 505'-511' may have been accessed or changed. For example, cell 507 was "Standard" in FIG. 5A and has been changed to "Premium" in FIG. 5B.

At step 305, the system may establish a value that represents a change in a component of a data table in a database. Illustrative examples of a component include a last record access of a row in the data table, a write command ("last changed") on a row or a cell in the data table, a particular data field in the data table, a particular row in the data table, last updated, and/or any other suitable components of the data table. Taking the example of a last record access, a previous or default value may be set as one (1). When a record has been accessed, the value indicative of the change may be set as two hundred (200) to reflect the change to the record. Thus the magnitude of the change of the last record access component of the data table of the database may be an increased magnitude of five times the previous or default value. The values set for each change of each component may be based on criteria set by a user. For example, one or more protocols may be established to reflect a change in a data table based upon a particular record that was accessed, a particular column that was accessed, a particular row that was accessed, and/or other protocols. In one example, a protocol may provide a set of values with a range from one (1) to X, where X is a number greater than 1. The value of 1 may be established as a base value to reflect a no change condition. For example, if a particular cell of a data table has not been accessed since a previous snapshot of the data table was generated, the base value of 1 may represent a no change condition. A variety of protocols may be utilized together for establishing the values representative of the changes in the components of a data table in a database. Thus, a particular component that, if accessed or changed, may be reflective of a possible intrusion into the database and thus may have a higher value for a change to that component. The magnitude of change may be based on time. Every time an element, such as a row, a column, or an element of a table changes, a timestamp may be recorded. The magnitude of the change of each element may be indicative of the time since the last change, e.g., the greater the time, the larger the magnitude, or the less amount of time since the last change, the smaller the magnitude. The magnitude of change also may be indicative of a user's aggregate changes, e. g., the more the change in a given timeframe, for example, 10 minutes, the greater the magnitude of all changes. Accordingly, a magnitude of change may be indicative of a time change for an element but may also or alternatively be based on a user set value change, e.g., the fact that an element was changed at all.

For every cell within the data table of the database that is changed/edited, a magnitude of change may be tracked. Each change in a data table may be associated with a user accessing the data table in some manner. Whether reading from the data table or writing to the data table, a user may be associated with the change. For each of a plurality of components in the data table, a value that represents the change in the corresponding component of the data table in the database may be established.

At step 310, the system may track one or more changes in one or more components of the data table in the database. For example, the system may track the changes in data table 500 occurring from FIG. 5A to FIG. 5B. The tracking of the changes may be represented as a snapshot of the changes. A snapshot is a view of a database as it was at a certain point in time. A snapshot is consistent with a source database as of the moment of the snapshot's creation. It may be a copy of the data and the state of a data table. The snapshot may represent the magnitudes of all changes within the data table of the database. For example, based upon criteria for one or more protocols for changes to a data table, a snapshot may provide a read-only, static view of the source database with magnitude of changes reflected by one or more applied protocols for applying the values to reflect changes.

For each change, there may be an associated user. As accessing and changing cells within a data table of a database are common operations and generally not per se prohibited, such changes may not be reflective of an actual intrusion in the database by an unauthorized user. Many users may have authorized access to read and/or write to one or more cells of a data table of a database. The snapshot may represent the changes over a period of time that are associated with a specific user and/or specific group of users, for example for a specific user for a period of ten (10) minutes. The period of time may vary or may be a constant period to reflect on changes in the data table. The period of time may be established by an administrator of the database that includes the data table.

At step 315, the system may initialize a background subtraction technique on the snapshot. A background subtraction technique may allow the foreground of a snapshot to be extracted for further processing, for example for object recognition. Background subtraction is a technique used in image recognition systems. For video stream applications, a background subtraction technique may be applied to detect moving objects within a video stream. Algorithms that are part of the technique segment the foreground objects from the background of a sequence. This technique for image recognition can be applied in the present disclosure by treating the snapshot as a single frame in a video stream and treating previous snapshots as previous frames in the video stream. Thus, the changes from one snapshot to another snapshot may be treated as the "moving object" in a video stream. Accordingly, by applying a background subtraction technique to snapshots of a data table in a database, the segmented changes, treated as the foreground objects in a video stream, may be represented by a matrix that is reflective of the changes. The input to the background subtraction technique may include the snapshot from step 310 and at least one previous snapshot. The at least one previous snapshot may be a most previous snapshot from a period of time prior to the current snapshot, e.g., ten minutes, and/or a snapshot prior to the most previous snapshot, e.g., 20 minutes prior to the current snapshot. As part of the background subtraction technique, values to reflect the changes may be normalized to one (1). Thus, if the largest magnitude change value is represented as 200, any change value in the snapshot as 200 would be normalized to 1 and all other values would accordingly be normalized as the value of the change/200 and a no change condition would thus be normalized to 0.005, i.e., value of the change (e.g., 1)/200. FIGS. 6A-6B depict an example changed data table 600 representative of a magnitude of change according to one or more aspects of the disclosure. FIG. 6A may be an example of a snapshot of changes where a "no change" situation is valued at a default 1. Other changes have been modified to reflect a 100 times magnitude change, e.g., 605, a 50 times magnitude change, e.g., 607, a maximum 200 times magnitude change, e.g., 200, and a 2.5 times magnitude change, e.g., 611. FIG. 6B is an example of the snapshot in FIG. 6A where the values within the snapshot have been normalized to 1. Thus the maximum value, e.g., 200, is divided throughout the snapshot to produce a normalized snapshot.

At step 320, the system may determine whether a particular change is to a row of the data table. Alternatively, the determination may be as to whether the change is to a cell of the data table. For example, the tracking of the changes may be on a row by row basis of the data table in the database. Alternatively, the tracking of the changes may be on a cell by cell basis of the data table of the data base. By utilizing a background subtraction technique, changes to the data table of the database may be specifically addressed. If the particular change is to a row in the data table, the method moves to step 325. Else, the method moves to step 340.

Figure 7A:
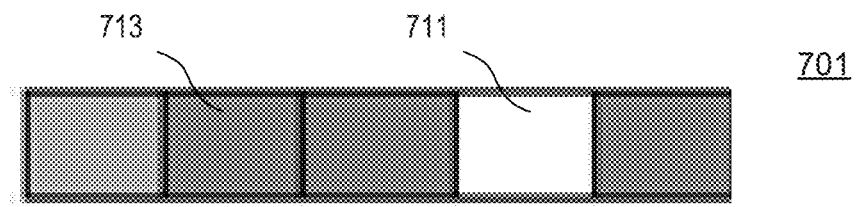
FIGS. 7A-7D depict example matrices representative of changes in a data table in a database according to one or more aspects of the disclosure.

At step 325, the system may determine whether the background subtraction technique has two or more inputs. If the input to the background subtraction technique is two inputs, e.g., a current snapshot of row values and a previous snapshot row values, the method moves to step 330 where the system may generate a one dimensional (1D) matrix representative of the change in the row of the data table of the database. A 1D matrix may be a visual representation of the magnitude change of rows in the data table. The visual representation may be a pixel brightness. Similarly a normalized magnitude change, e.g., 0.005) which was reflective of a "no change" value, e.g., 1, may correlate to a least bright pixel intensity value, e.g., pixel 713. FIG. 7A depicts an example 1D matrix 701 representative of the change in each row of a data table in a database according to one or more aspects of the disclosure. The 1D matrix may then be utilized with a model including a neural network architecture to identify one or more intruders in the database.

Figure 7B:
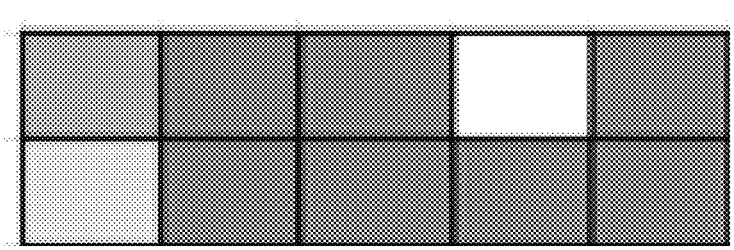

If the input to the background subtraction technique is not two inputs but rather three or more inputs, e.g., a current snapshot and two previous snapshots, in step 325, the method moves to step 335 where the system may generate a two dimensional (2D) matrix representative of the change in the row of the data table of the database over multiple time periods. Such a 2D matrix may be a visual representation of the magnitude changes of rows in the data table. The visual representation may be a pixel brightness that reflects the magnitude changes for each row. In such a case, the 2D matrix may then be utilized with a model including a neural network architecture to identify an intruder in the database. FIG. 7B depicts an example 2D matrix 703 representative of the changes in each row of a data table in a database according to one or more aspects of the disclosure.

Figure 7C:
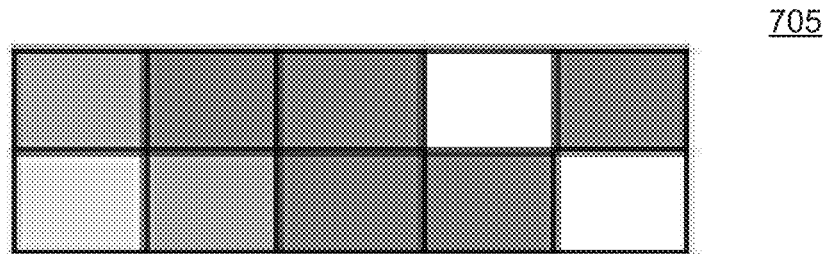

If the system determines that the change is not to a row in step 320 but rather to a cell having to take into account the row value and a column variable, then at step 340 the system may determine whether the background subtraction technique has two or more inputs. If the input to the background subtraction technique is two inputs, e.g., a current snapshot of row values and a previous snapshot, the method moves to step 335 where the system may generate a two dimensional (2D) matrix representative of the change in the cell of the data table of the database. Such a 2D matrix may be a visual representation of the magnitude change of cells in the data table. The visual representation may be a pixel brightness that reflects the magnitude change for each cell. The 2D matrix may then be utilized with a model including a neural network architecture to identify one or more intruders in the database. FIG. 7C depicts an example 2D matrix 705 representative of the change in each cell of a data table in a database according to one or more aspects of the disclosure.

Figure 7D:
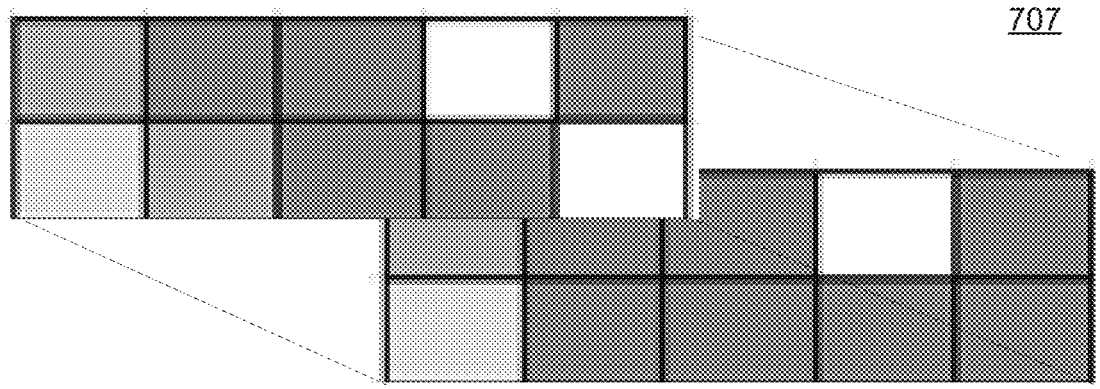

If the input to the background subtraction technique is not two inputs but rather three inputs, e.g., a current snapshot and two previous snapshots, in step 340 the method moves to step 345 where the system may generate a three dimensional (3D) matrix representative of the change in the cell of the data table of the database over multiple time periods. Such a 3D matrix may be a visual representation of the magnitude changes of cells in the data table. The visual representation may be a pixel brightness that reflects the magnitude changes for each cell. In such a case, the 3D matrix may then be utilized with a model including a neural network architecture to identify one or more intruders in the database. FIG. 7D depicts an example 3D matrix 707 representative of the changes in each cell of a data table in a database according to one or more aspects of the disclosure. In accordance with the description herein, a matrix may be generated from more numerous inputs to be a matrix having any of a number of dimensions ("N"). Accordingly, such a matrix may be a four dimensional matrix, a five dimensional matrix, and so forth to an "N" dimensional matrix. For example, a generated matrix may be a 4D matrix as a representation of changes to a database by column, by row, by time, and by depth, where depth may be an array of values.

Figure 4:
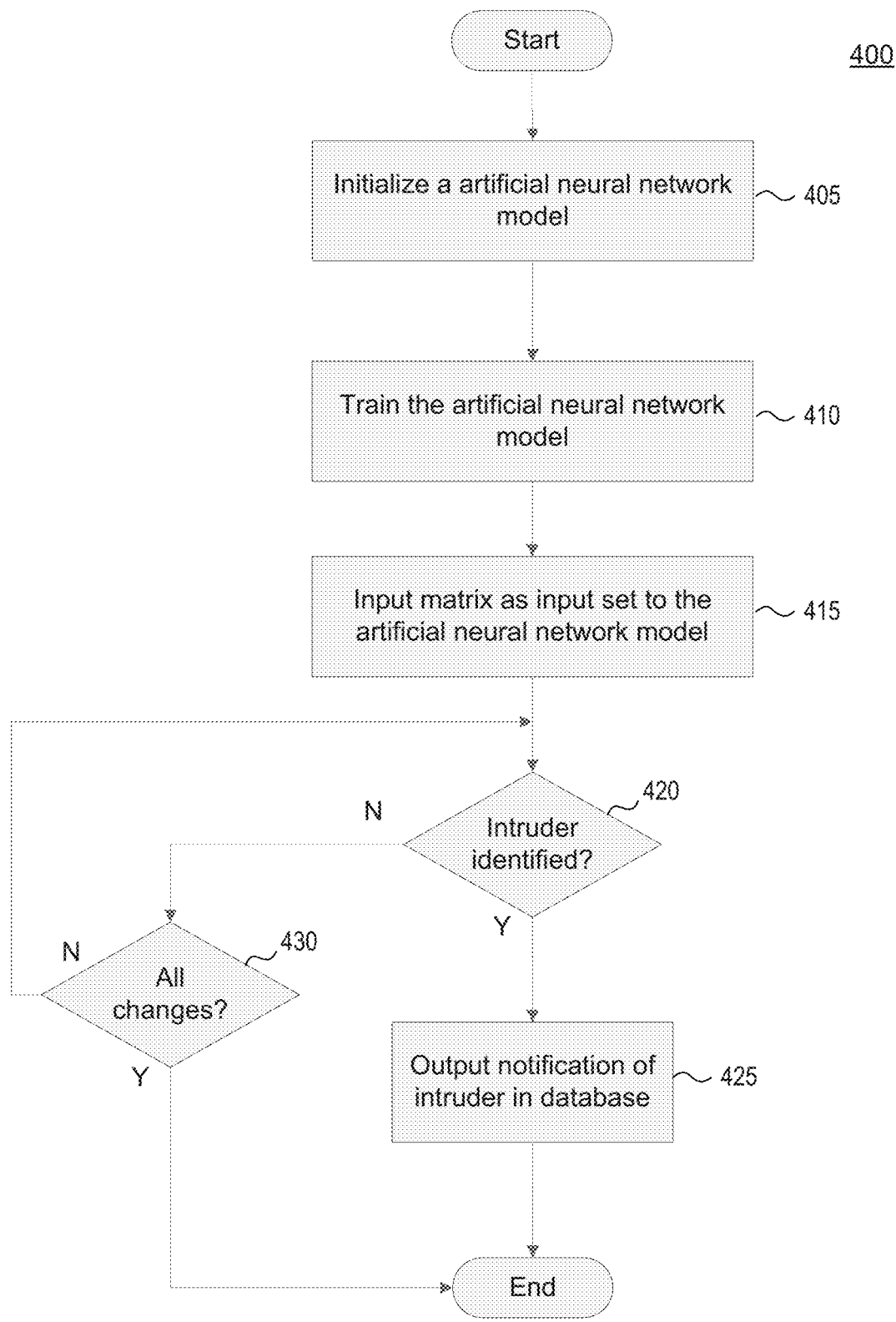
FIG. 4 depicts a flow chart for a method for identifying an intruder in a database in accordance with one or more illustrative aspects discussed herein.

FIG. 4 illustrates an example method 400 for method of identifying an intruder in a database in accordance with one or more aspects discussed herein. Like method 300, method 400 may be implemented by a suitable computing system, as described further herein. For example, method 400 may be implemented by any suitable computing environment by a computing device and/or combination of computing devices, such as computing devices 101, 105, 107, and 109 of FIG. 1. Method 400 may be implemented in suitable program instructions, such as in machine learning software 127, and may operate on a suitable training set, such as training set data 129. The start of method 400 also may occur following step 330, step 335, or step 345 in FIG. 3.

At step 405 the system may initialize a model having an artificial neural network architecture and a plurality of model parameters. Such an artificial neural network architecture may include an input layer, an output layer, and one or more hidden layers. Still other artificial neural networks, such as a deep neural network architecture (e.g., a convolutional neural network architecture) may include one or more convolutional layers and one or more pooling layers. The model having the artificial neural network architecture in step 405 may be configured to detect unauthorized access to the database based on changes to a data table in the database. Other illustrative artificial neural network architectures also include a recurrent deep neural network architecture, such as a recurrent convolutional neural network architecture.

At step 410, the system may iteratively train the model through a model training process. The system may train the model, based on a training set, to refine the model parameters. The system may train the model including an artificial neural network to identify one or more intruders in a database. The system may train the model a second time utilizing a second training set, and additional training sets as necessary, to train the model to identify one or more intruders in a database based upon a matrix input to the model.

At step 415, the system may receive a matrix as an input data set to the model including an artificial neural network architecture. The matrix may be any of the 1D matrix generated in step 330, the 2D matrix generated in step 335, whether as a multiple time period row change in the data table or a single time period cell change in the data table, or the 3D matrix generated in step 345. In one example, the matrix used as an input to the model in step 415 may be a heat map. As part of the step 415, the system may generate the heat map corresponding to the matrix. In such a situation, the model including the artificial neural network architecture may identify one or more intruders in the database based upon the brightness of the heat map as to certain components of the data table of the database. The matrix generated in any of steps 330, 335, and 345 may include pixel intensity values. Such pixel intensity values, when applied to a visual representation, may correspond to the heat map of the changes. The brighter the pixel intensity value, the higher the magnitude for the change as part of the matrix. Examples of matrices generated in steps 330, 335, and 345 are shown in FIGS. 7A-7D and were discussed above.

At step 420, the system may determine whether an intruder has been identified. Identification of an intruder in a database may be made by application of the matrix input to the model including the artificial neural network architecture. As the model including the artificial neural network architecture has been trained to identify one or more intruders based upon a matrix input set, whether a 1D, 2D, or 3D matrix input set, an output data set of the model may be an identification of an intruder in the data table of the database or a confirmation that no intruder has accessed the data table of the database. The model may have been trained to identify an intruder based upon a particular configuration of changes of certain magnitudes to components in a data table of a database. The model may have been trained to account for the magnitude of a plurality of changes of a plurality of components of the data table to identify one or more such changes as being attributable to an intruder, i.e., an unauthorized user, to the database. If an intruder is identified in step 420, the method moves to step 425. Else, if no intruder is detected, the method moves to step 430.

At step 425, based upon the identification of an intruder, the model may output a data set including an indication of the intruder to the database. Such an indication of an intruder may be a notification to an administrator of the database. The notification may include an identification of the particular row and/or cell of the data table that had an intruder access. The notification may include additional information as to the intrusion in the database including the time associated with the snapshots utilized for identification of the intrusion.

If an intrusion was not identified in step 420, the method moves to step 430 where the system may determine whether all changes in components of the data table in the database have been accounted for by utilizing the artificial neural network architecture. If all of the changes had not yet been accounted for, the method may return to step 420. If all changes have been accounted for, the method ends having identified no intrusion to the data table in the database.

An artificial neural network is one type of image detection system that may be utilized to detect an unauthorized user in a database. As described herein, one component of a data table in a database that may be tracked for a change is the user associated with a change to a particular cell of the data table. In some situations, a plurality of users to a database may have similar behaviors in accessing and/or changing a database as other users. Similarly, a plurality of users with similar access privileges and/or similar parameters for accessing and/or changing a database may exist. In such situations, clusters of such like users may be identified. With clusters identified, a system may track to determine whether the clusters of users who access and/or change a database are operating outside their normal behavioral patterns. The background subtraction technique described herein may be utilized to determine such. For example, a cluster of users may have a matrix generated from the background subtraction technique described herein as very dim for one or more components being tracked. Accordingly, an output data set from an image detection system with such a matrix as an input may be a determination that no unauthorized access to the database has occurred. Such an output data set may be determined based upon determining that one or more clusters of users with similar parameters for use of the database were within one or more normal behavioral patterns.

Some aspects described herein may provide benefits for intrusion of a database by utilizing a model including an artificial neural network architecture, such as: more accurately identifying intrusion within a database, identifying intrusion within a database more quickly in order to address the identified intrusion more rapidly, applying known patterns of intrusion to address new intrusion methods in an efficient manner, and allowing for an increased efficiency in managing attempted data breaches to a database.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A computer-implemented method comprising:
    tracking at least one change in each of a plurality of components corresponding to a change in a row of a data table in a database as a snapshot of the at least one change, wherein the at least one change is associated with a user, wherein the at least one change corresponds to a last record access of the row of the data table in the database;
    establishing a value representative of the at least one change for each of the plurality of components;
    initializing a background subtraction technique on the snapshot using a previous snapshot to generate a matrix representative of the at least one change, wherein the background subtraction technique receives the snapshot, the previous snapshot, and at least one second previous snapshot as inputs, wherein the matrix is a two dimensional vector matrix;
    initializing a model having an artificial neural network architecture and a plurality of model parameters, wherein the artificial neural network architecture comprises an input layer, an output layer, and a plurality of hidden layers, the model configured to detect unauthorized access to the database based on changes to the data table;
    receiving the matrix as an input data set to the model;
    identifying the user as an unauthorized user based on an output data set generated by the model based on the input data set; and
    after identifying the user as the unauthorized user, transmitting a notification of the unauthorized user.

2. The method of claim 1, wherein the at least one change further corresponds to a last record change of the row of the data table in the database.

3. The method of claim 1, wherein the matrix comprises pixel intensity values, wherein the initializing the background subtraction technique comprises normalizing the value representative of the at least one change.

4. The method of claim 1, further comprising generating a heat map corresponding to the matrix.

5. The method of claim 1, further comprising building the model, based on a training set comprising a plurality of examples, to define the plurality of model parameters to identify intruders to the database.

6. The method of claim 1, wherein the artificial neural network architecture comprises a convolutional neural network.

7. The method of claim 6, wherein the convolutional neural network comprises a recurrent convolutional neural network.

8. The method of claim 1, wherein the artificial neural network architecture comprises a recurrent neural network.

9. A computer-implemented method comprising:
tracking at least one change in at least one component corresponding to a change in a row of a data table in a database as a snapshot of the at least one change, wherein the at least one change is associated with a user, wherein the at least one change corresponds to a last record access of the row of the data table in the database;
establishing a value representative of the at least one change for the at least one component;
initializing a background subtraction technique on the snapshot using a previous snapshot to generate a matrix representative of the at least one change, wherein the matrix comprises pixel intensity values, wherein the initializing the background subtraction technique comprises normalizing the value representative of the at least one change, wherein the background subtraction technique receives the snapshot and the previous snapshot as inputs;
initializing a model having an artificial neural network architecture and a plurality of model parameters, wherein the artificial neural network architecture comprises an input layer, an output layer, and a plurality of hidden layers, the model configured to detect unauthorized access to the database based on changes to the data table;
receiving the matrix as an input data set to the model;
identifying the user as an unauthorized user based on an output data set generated by the model based on the input data set; and
after identifying the user as the unauthorized user, transmitting a notification of the unauthorized user.

10. The method of claim 9, wherein the at least one component further corresponds to a last record change of the row of the data table in the database.

11. The method of claim 9,
wherein the at least one component is a plurality of components,
wherein the establishing the value representative of the at least one change comprises establishing the value representative of the at least one change for each of the plurality of components, and
wherein the tracking comprises tracking the at least one change for each of the plurality of components as the snapshot of the at least one change.

12. The method of claim 9, further comprising generating a heat map corresponding to the matrix.

13. The method of claim 9, further comprising building the model, based on a training set comprising a plurality of examples, to define the plurality of model parameters to identify intruders to the database.

14. The method of claim 9, wherein the matrix is a one dimensional vector matrix.

15. The method of claim 9, wherein the matrix is a two dimensional vector matrix.

16. The method of claim 9, wherein the at least one change in the at least one component corresponds to a change in a cell of the data table in the database.

17. The method of claim 16, wherein the matrix is a two dimensional vector matrix.

18. The method of claim 16, wherein the matrix is a three dimensional vector matrix.

19. The method of claim 9, wherein the artificial neural network architecture comprises a convolutional neural network.

20. An apparatus comprising,
one or more processors; and
memory storing instructions that, when executed by the one or more processors, cause the apparatus to perform:
tracking at least one change in each of a plurality of components corresponding to a change in a row of a data table in a database as a snapshot of the at least one change, wherein the at least one change is associated with a user, wherein the at least one change corresponds to a last record access of the row of the data table in the database;
establishing a value representative of the at least one change for each of the plurality of components;
initializing a background subtraction technique on the snapshot using a previous snapshot to generate a matrix representative of the at least one change, wherein the background subtraction technique receives the snapshot, the previous snapshot, and at least one second previous snapshot as inputs, wherein the matrix is a two dimensional vector matrix;
initializing a model having an artificial neural network architecture and a plurality of model parameters, wherein the artificial neural network architecture comprises an input layer, an output layer, and a plurality of hidden layers, the model configured to detect unauthorized access to the database based on changes to the data table;
receiving the matrix as an input data set to the model;
identifying the user as an unauthorized user based on an output data set generated by the model based on the input data set; and
after identifying the user as the unauthorized user, transmitting a notification of the unauthorized user.

* * * * *